United States Patent [19]
Rajadhyaksha

[11] 3,920,824
[45] Nov. 18, 1975

[54] STABLE OPHTHALMIC FORMULATION

[75] Inventor: Vithal Jagannath Rajadhyaksha, Mission Viejo, Calif.

[73] Assignee: Nelson Research & Development Co., Irvine, Calif.

[22] Filed: Aug. 1, 1974

[21] Appl. No.: 493,751

[52] U.S. Cl. ............................................. 424/274
[51] Int. Cl.² .......................................... A61K 31/40
[58] Field of Search .................................. 424/274

[56] References Cited
UNITED STATES PATENTS
3,354,178    11/1967    Dickinson ........................ 260/326.3

OTHER PUBLICATIONS
Handbook of Non-Prescription Drugs–Lofholm, Paul W. pp. 99–107 (1973).

Primary Examiner—Leonard Schenkman
Attorney, Agent, or Firm—Martin A. Voet

[57] ABSTRACT

A stabilized, topical ophthalmic formulation containing a compound having the formula

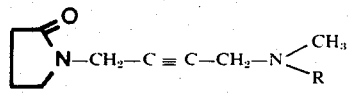

where R is methyl or ethyl and pharmaceutically acceptable salts thereof, and its method of making. The formulation may be used therapeutically to temporarily alleviate the symptoms of glaucoma.

2 Claims, No Drawings

STABLE OPHTHALMIC FORMULATION

BACKGROUND OF THE INVENTION

1. Field of the Invention

The invention relates generally to a method of stabilizing an ophthalmic formulation and the resulting composition. More particularly, the invention relates to a stabilized, topical ophthalmic formulation which may be used therapeutically to temporarily alleviate the symptoms of glaucoma.

2. Background of the Prior Art

U.S. patent No. 3,354,178 discloses compounds having the structural formula

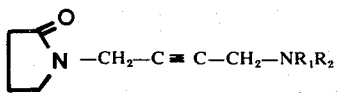

where $R_1$ and $R_2$ are both methyl or where $R_1$ and $R_2$ are both ethyl, as stimulants of the central nervous system. Portions of U.S. Pat. No. 3,354,178 relevant to the synthesis of the active compounds of the present invention are hereby incorporated by this reference.

Glaucoma is a condition of the eye characterized by increased intraocular pressure. Untreated, the condition eventually leads to irreversible retinal damage and blindness. Conventional therapy for glaucoma is with pilocarpine and/or epinephrine administered topically several times daily. The drawbacks of pilocarpine are that it may sting the eye of the user; it is a natural product and therefore subject to changes in composition and finally that chronic pilocarpine therapy usually entails increasing dosages with time, i.e., up to 4% concentration, to maintain activity of the drug. In many cases of extended treatment with pilocarpine, the drug becomes ineffective.

It has now been discovered that the foregoing problems may be overcome by the present invention which relates to a process for the preparation of a stable topical ophthalmic composition containing an active compound having the structural formula

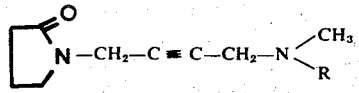

wherein R is methyl or ethyl, and pharmaceutically acceptable acid addition salts thereof, characterized by combining the active compound with a topical ophthalmic pharmaceutical carrier sufficient to maintain the pH of the composition between about 4.0 and 7.5.

The present invention also relates to a stable therapeutic composition comprising a topically administrable ophthalmic carrier and an effective amount of a compound having the structural formula

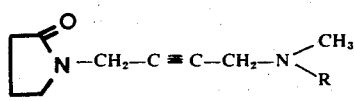

wherein R is methyl or ethyl, and pharmaceutically acceptable acid addition salts thereof. Advantageously, the topical carrier should maintain said composition at a pH between about 4.0 and 7.5.

The present invention further relates to a method for temporarily alleviating the symptoms of glaucoma in humans comprising topically administering in the eye of a human having glaucoma an effective amount of the above-described composition.

The active compounds of the present invention can be made by any suitable method, e.g., the methods described in U.S. Pat. No. 3,354,178. As will be obvious to those skilled in the art, the non-toxic addition salts of these compounds also may be prepared. Accordingly, it will be understood that conventional pharmaceutically acceptable addition salts thereof are included within the present invention. Many physiologically and pharmaceutically acceptable salts may be employed in the present invention. Examples of suitable acids to form salts with the active compounds of the present invention include fumaric, citric, hydrochloric, nitric, sulfuric and tartaric acids.

Suitable ophthalmic carriers are known to those skilled in the art and all such conventional carriers may be employed in the present invention. Thus a particular carrier may take the form of a sterile ophthalmic ointment, cream, gel, solution, or dispersion and preferably a solution. Also including as suitable ophthalmic carriers are slow releasing polymers, e.g. "Ocusert" polymers, "Hydron" polymers, etc. Stabilizers may also be used such as, for example, chelating agents, e.g., EDTA. Anti-oxidants may also be used, e.g. sodium bisulfite, sodium thiosulfite, 8-hydroxy quinoline or ascorbic acid. Sterility typically will be maintained by conventional ophthalmic preservatives, e.g. chlorbutanol, benzalkonium chloride, cetylpyridinium chloride, phenyl mercuric salts, thimerosal, phenethyl alcohol, etc., for aqueous formulations, and used in amounts which are non-toxic and which generally vary from about 0.001 to about 0.1% by weight of the aqueous solution. Conventional preservatives for ointments include methyl and propyl parabens. Typical ointment bases include white petrolatum and mineral oil or liquid petrolatum. However, preserved aqueous carriers are preferred. Solutions may be manually delivered to the eye in suitable dosage form, e.g., eye drops, or delivered by suitable microdrop or spray apparatus typically affording a metered dose of medicament. Examples of suitable ophthalmic carriers or stabilizers include sterile, substantially isotonic, aqueous solutions containing minor amounts, i.e., less than about 5% by weight hydroxypropylmethylcellulose, polyvinyl alcohol, carboxymethylcellulose, hydroxyethylcellulose, glycerine, EDTA, sodium bisulfite and ascorbic acid.

The amount of active compound to be used in the therapeutic treatment of glaucoma will vary with the age of the patient and the severity of the glaucoma. Generally a dose level of one or two drops of the foregoing aqueous solution 1–4 times daily would be a suitable dosage amount. Generally, the concentration of active compound will vary between about 0.001 and about 5% and preferably between about 0.05 and about 1% (wt./v. calculated on the basis of the free base).

The manner in which the ophthalmic solution is stabilized is based on the discovery that the solution is stable in the pH of about 4.0 – 7.5. Above this pH range, the stability falls off rapidly, and below about pH 4.0, the solution is too acidic and may irritate and sting the eye of the user. The solutions of the present invention may be maintained between about pH 4.0 and 7.5 with suitable amounts of buffering agents including borate, carbonate, phosphate, Tris (hydroxymethyl aminomethane), acetate and citrate buffers.

A preferred ophthalmic composition is a preserved aqueous solution containing the following ingredients at approximately the indicated concentration.

| | |
|---|---|
| Active compound | 0.001 – 1 wt. % |
| Stabilizer | 0.01 – 0.1 wt. % |
| Preservative | 0.005 – 0.5 wt. % |
| Buffer (sufficient to maintain pH between about 4.0 and 7.5) | 0.1 – 0.001 M |
| NaCl qs. ad. | (isotonic) |
| Water qs. ad. | 100% |

To illustrate the manner in which the invention may be carried out, the following examples are given. It is understood, however, that the examples are for the purpose of illustration and the invention is not to be regarded as limited to any of the specific materials or conditions therein.

EXAMPLE I

This example compares the effect of pilocarpine (a conventional drug used for the treatment of glaucoma) against the effect of the active compounds of the present invention on rabbit intraocular pressure (IOP) as assayed by miosis. Seven New Zealand female albino rabbits were used. They were restrained and a premeasured amount (0.05 ml) was instilled into one eye with the lid being pulled back and held to minimize leakage. The compounds were given in isotonic phosphate buffer (pH 7.4) at the indicated concentrations. The untreated eye served as a control. Observations were made according to the following scale:

Scale
0 – No constriction
1 – Mildly constricted
3 – Moderately constricted
5 – Severely constricted (pinpoint)

Table 1 below tabulates the data obtained in the test.

Table 1

| Compound | | Conc. used (%) | Miotic effect at 30 min. | Duration of miotic effect (min.) |
|---|---|---|---|---|
| (1) |  | 0.01 | 3.0 | 90 |
| (2) |  | 0.1 | 3.5 | 120 |
| (3) | Pilocarpine | 1.0 | 3.5 | 150 |
| (4) | Pilocarpine | 2.0 | 4.0 | 210 |
| (5) |  | 0.1 | ineffective | — |

Table 1 shows clearly that the active compounds of this invention, compounds No. 1 and 2, are comparable in effect to pilocarpine at 1/10 – 1/100 the concentration of pilocarpine. Note that compound No. 5, which is a close homologue to compound Nos. 1 and 2, in inactive.

I claim:

1. A method for temporarily alleviating the symptoms of glaucoma in humans comprising topically administering to the eye of a human having glaucoma an effective amount of a compound having the structural formula

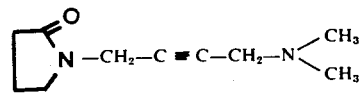

or a pharmaceutically acceptable acid addition salt thereof.

2. A method for temporarily alleviating the symptoms of glaucoma in humans comprising topically administering to the eye of a human having glaucoma an effective amount of a compound having the structural formula

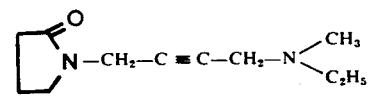

or a pharmaceutically acceptable acid addition salt thereof.

* * * * *